United States Patent [19]

Hayashi et al.

[11] Patent Number: 5,789,721
[45] Date of Patent: Aug. 4, 1998

[54] HIGH-FREQUENCY INDUCTION HEATER AND POWER SOURCE CIRCUIT FOR SAME

[75] Inventors: Morinobu Hayashi; Koichi Nagai; Akihiro Hirano, all of Kyoto, Japan

[73] Assignee: Horiba, Ltd., Kyoto, Japan

[21] Appl. No.: 453,625

[22] Filed: May 30, 1995

[30] Foreign Application Priority Data

Jun. 4, 1994 [JP] Japan .................................. 6-145342

[51] Int. Cl.$^6$ ........................................................ H05B 6/06
[52] U.S. Cl. .......................... 219/664; 219/635; 219/665; 373/148
[58] Field of Search ........................... 219/663, 664, 219/665, 666, 667, 656, 635; 373/138, 147, 148

[56] References Cited

U.S. PATENT DOCUMENTS

| | | |
|---|---|---|
| 3,867,563 | 2/1975 | Laflin ............................ 219/661 |
| 4,433,226 | 2/1984 | Wagar ........................... 219/656 |
| 4,639,279 | 1/1987 | Chatterjee ..................... 219/640 |
| 4,736,082 | 4/1988 | Matsuo et al. ................. 219/665 |
| 4,962,292 | 10/1990 | Aoki ............................. 219/665 |
| 5,428,208 | 6/1995 | Chatterjee et al. ............ 219/635 |

*Primary Examiner*—Philip H. Leung
*Attorney, Agent, or Firm*—Price, Gess & Ubell

[57] ABSTRACT

A high-frequency induction heater having a working coil for providing a high-frequency application of power to a sample is provided with a control circuit for controlling the amount of power to the working coil. A phase control member can be triggered to provide a first level of power to the sample to heat it below its combustion level, to thereby remove any exterior stains. Subsequently, a second level of power can be applied for a predetermined period of time to heat it to a combustion point whereby the combustion gases of the sample are free from any byproducts of the stain and an accurate measurement can be accomplished.

17 Claims, 5 Drawing Sheets

HIGH-FREQUENCY INDUCTION HEATER AND POWER SOURCE CIRCUIT FOR SAME

BACKGROUND OF THE INVENTION

1. Field of the Invention

The present invention relates to a high-frequency induction heater and, more particularly, a power source circuit for controlling the induction heater.

2. Description of Related Art

Conventionally, in measuring concentrations of carbon, sulfur, and the like contained in a sample, such as metal specimens, the sample has been burnt utilizing an induction heating in a high-frequency combustion furnace. The high-frequency induction heater will generate oxidized gases which can subsequently be analyzed by means of an infrared gas analyzer.

However, in order to burn the sample in such a high-frequency combustion furnace, it is required to supply a work coil with an appointed high-frequency output (electric power). A power source circuit as shown in FIG. 5 has been used in the conventional high-frequency induction heaters. Referring to FIG. 5, reference numeral 1 designates a high-frequency combustion furnace, and reference numeral 2 designates a work coil of the high-frequency combustion furnace 1. Reference numeral 3 designates a transmission circuit connected with the work coil 2 for supplying the work coil 2 with a high-frequency output. The transmission circuit 3 comprises a transmission tube or oscillator 4 including a three-poled vacuum tube 4, a choke coil 5 connected with a plate of the oscillator tube 4, and two condensers 6, 7 connected in series between the plate and a grid of the oscillator tube 4.

Reference numeral 8 designates a direct current power source-supplying portion for supplying the transmission circuit 3 with a variable direct current. The direct current power source-supplying portion 8 comprises a transformer 9, a triac 10 as a phase control element provided on a primary side of the transformer 9, and a rectifier bridge 11 provided on a secondary side of the transformer 9 and connected with the oscillator tube 4 through the choke coil 5 on an output side thereof. An alternating current power source 14 of alternating current, for example, 200 V (50/60 Hz) is connected with the direct current power source-supplying portion 8 through input terminals 12, 13. In addition, a plate ammeter 15 for monitoring a plate current of the oscillator tube 4 is connected with the rectifier bridge 11.

Reference numeral 16 designates a trigger circuit for supplying the triac 10 with a trigger signal. The trigger circuit 16 comprises a diac 17, a condenser 18, a variable charging resistance 19, and a discharging resistance 20.

In the conventional high-frequency induction heater having the above-described construction, provided that the triac 10 is not electrified, the condenser 18 is charged. When its charging voltage exceeds an appointed value, the condenser 18 is discharged and the diac 17 is electrified. By this electrification of the diac 17, the triac 10 is triggered and thus electrified.

By repeatedly charging and discharging the condenser 18 on the basis of a time-constant of charging or discharging determined by the condenser 18, the charging resistance 19 and the discharging resistance 20, a trigger pulse as shown in FIG. 6(B) is output from the diac 17. The triac 10 is struck on the basis of the trigger pulse, and a voltage of the alternating current power source 14 is switched by means of the triac 10 struck by an appointed striking angle or phase angle of the AC wave to be modulated as shown in FIG. 6(A). This voltage is supplied to the transmission circuit 3 through the transformer 9 and the rectifier bridge 11. A high-frequency output, which was modulated by a phase-controlled wave as shown in FIG. 6(B), is supplied to the work coil 2 from the transmission circuit 3.

However, in such a conventional high-frequency induction heater, the triac 10 is usually supplied with a pulse as shown in FIG. 6(B) to be triggered, whereby phase controlling the voltage supplied to the transmission circuit 3. Thus, a set electric power (for example, the maximum output) is usually given to the work coil 2. If it is intended to suppress the electric power given to the work coil 2 to a reduced value, it is required to reduce the striking angle of the triac 10, since not only influences by noises and a surging electric current on the side of the alternating current power source and noises generated from the triac 10 itself are apt to be produced, but also a pulse level is reduced. Thus, it is difficult to effect a trigger as shown in FIG. 6(C). As a result, any output control in a low-output range is unstable in the above-described construction shown in FIG. 5.

Consequently, in the conventional high-frequency induction heater, usually an appointed high-frequency output is charged, as shown by a mark A in FIG. 7. Thus, once a sample begins to be burnt, the sample is frequently burnt at a single stroke by combustion heat from the electric power charge, and sometimes the sample is bumped or an abnormal analytical value is shown. In addition, referring to FIG. 7, a curve shown by a mark B is an extraction curve of carbon contained in the sample (iron).

Additionally, a portion of a sample to be analyzed can frequently stain a surface of another sample as a result of contact with an operator's hand. Thus, a sample is not always clean. In the case where such a stained sample is burnt by charging the high-frequency combustion furnace 1 with an appointed high electric power, the staining fractions adhered to the surface of the sample are added to a concentration of the original carbon to produce an error in an analytical result. Consequently, a pretreatment, in which an initial heat treatment is carried out at relatively lower temperatures, such as 400 to 500° C., at which the sample is not burnt and decarbonized, to remove stains (carbon fractions) adhered to the surface of the sample, has to be conducted. Thus, the analysis has been considerably troublesome.

FIG. 4 shows a high-frequency output supplied and a carbon-extracting state when a clean sample and a stained sample were heated. FIG. 4(A) shows the case where the clean sample was heated, while FIG. 4(B) shows the case where the stained sample was heated. Referring to each drawing, marks I and II designate the high-frequency output charged and a concentration of carbon extracted, respectively. In the case where the high-frequency output was kept at a value of 20 % or less of the maximum output or a controllable lower limit (a portion ① in FIG. 4), no extraction of carbon was observed for the clean sample, as shown in FIG. 4(A), while an extraction of carbon was found for the stained sample, as shown by mark X in FIG. 4(B). On the other hand, in the case where the high-frequency output was kept in the vicinity of the maximum value (a portion ② in FIG. 4), an almost equivalent extraction of carbon was observed for both the clean sample and the stained sample.

OBJECTS AND SUMMARY OF THE INVENTION

The present invention was achieved in view of the above-described matters, and it is an object of the present invention to provide a high-frequency induction heater capable of analyzing a sample with high accuracy without requiring any troublesome pretreatment.

It is another object of the present invention to provide a power source circuit for a high-frequency induction heater capable of conducting a precise output control within not only a high-output range, but also a low-output range.

In order to achieve the above-described object, a high-frequency output, which is low enough so as not to burn the sample, is supplied to the high-frequency combustion furnace to heat the sample for an appointed time in an initial sample-heating step followed by supplying the high-frequency combustion furnace with a high-frequency output capable of burning the sample.

A power source circuit for a high-frequency induction heater is provided with a transmission circuit connected with a work coil of the high-frequency combustion furnace and a phase-controlling element for controlling the high-frequency outputted from the transmission circuit wherein a direct current signal of an appointed level or greater is given to the phase-controlling element as a trigger signal through an insulating circuit.

According to the first feature of the invention, a high-frequency output, which is low enough not to burn and decarbonize the sample (shown by a mark III in FIG. 3), is supplied to the high-frequency combustion furnace 1. As shown in FIG. 3, stains adhered to a surface of the sample are burnt to generate a carbonic acid gas (shown by a mark ③ in FIG. 3) due to combustion in the initial sample-heating step. At this time, the carbon within the sample is not burnt and, thus, the sample is not decarbonized. Subsequently, the sample is completely burnt by supplying the high-frequency combustion furnace 1 with a high-frequency output capable of burning the sample (shown by a mark IV in FIG. 3) to generate a carbonic acid gas (shown by a mark ④ in FIG. 3) due to carbon contained within the sample. Carbon contained within the sample and carbon adhered to the surface of the sample are extracted with a time-lag under the condition that they are separated from each other (said marks ③, ④ during combustion, so that a concentration of carbon contained in the sample can be accurately analyzed.

According to a second feature of the invention, a direct current signal of an appointed level or greater is given to the phase-controlling element 10 as the trigger signal through the isolating circuit. Thus, the phase-controlling element 10 can be surely triggered without being influenced by noises, any surge of electric current on the side of an alternating current power source 14, and noises generated from the phase-controlling element 10 itself. As a result, an output control can be surely achieved within not only a high-output range, but also a low-output range.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 2 is an operation diagram of the high-frequency induction heater, in which

FIG. 4 shows a high-frequency output supplied and a carbon-extracting state when a clean sample and a stained sample were heated, in which

FIG. 6 is an operation diagram of the conventional high-frequency induction heater, in which

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an improved high-frequency induction heater and a power source circuit for accurately controlling the heater.

Figure 1:
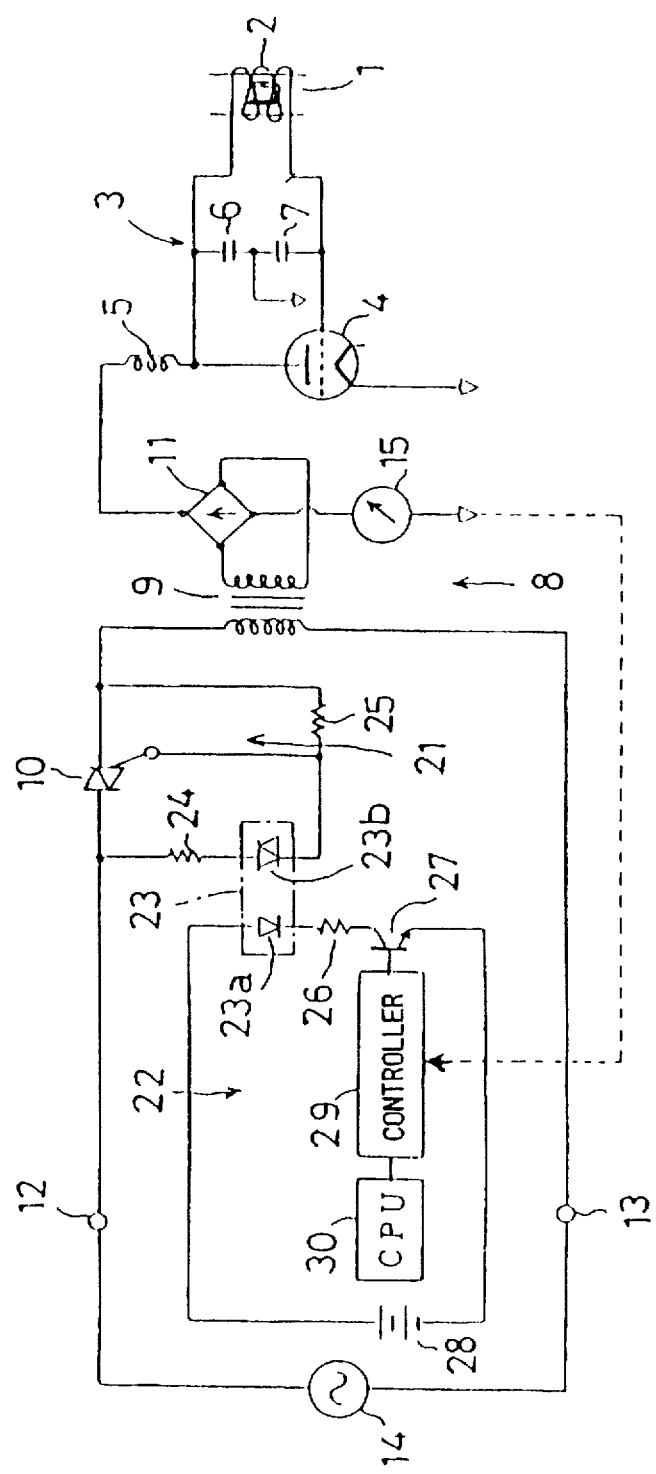
FIG. 1 is a circuit diagram showing one example of an electric construction of a high-frequency induction heater according to the present invention.
Figure 5:
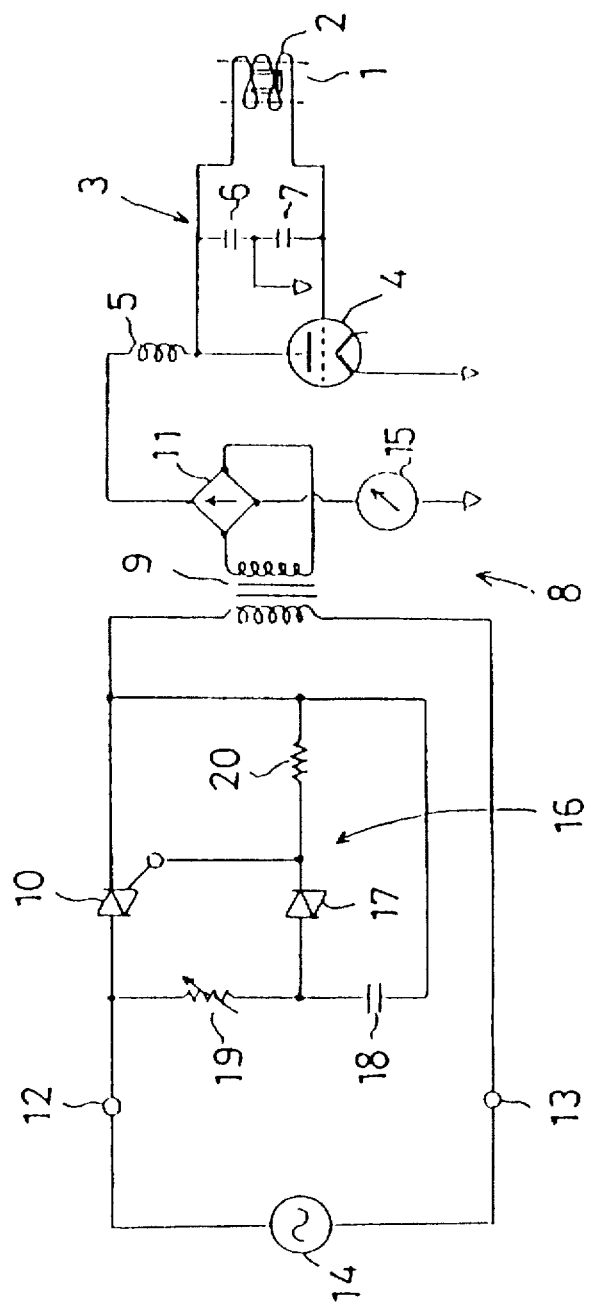
FIG. 5 is a circuit diagram showing an electric construction of a conventional high-frequency induction heater.
Figure 6A:
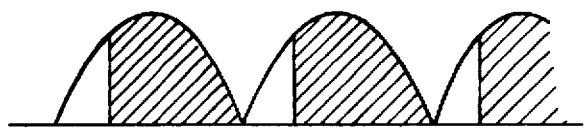
FIG. 6(A) shows a phase-controlling waveform.
Figure 6B:
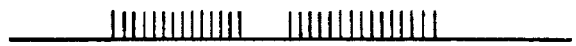
FIG. 6(B) shows a trigger signal wave.
Figure 6C:
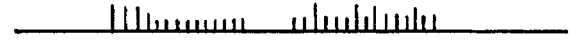
FIG. 6(C) shows a trigger signal in a preferred embodiment wherein an output is low.
Figure 7:
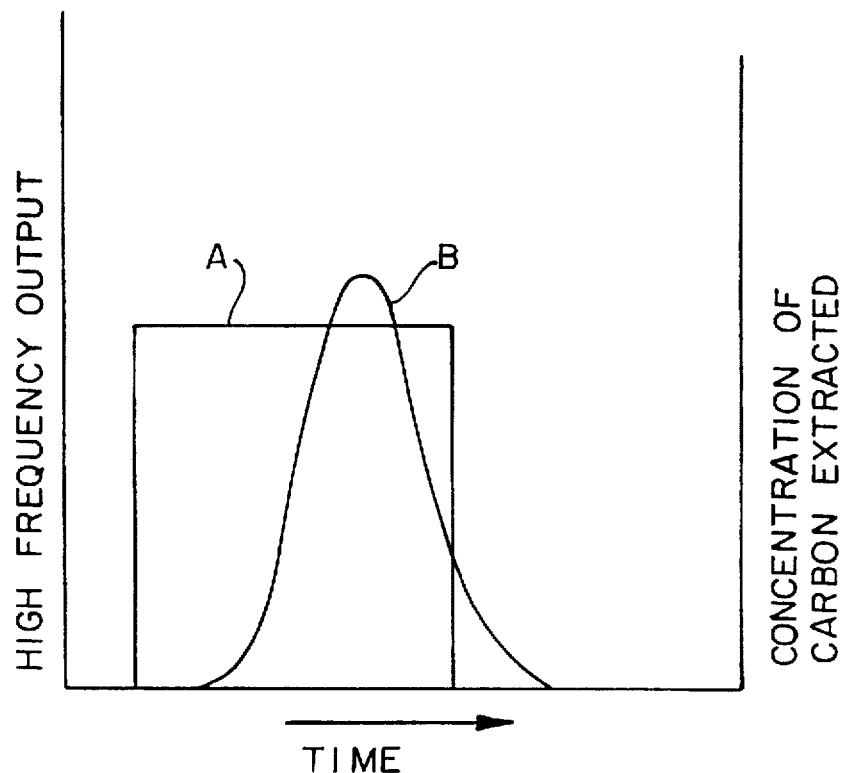
FIG. 7 is a drawing showing an approximate relationship between a high-frequency output and a concentration of carbon extracted in the conventional high-frequency induction heater.

FIG. 1 shows one example of an electric construction of a high-frequency induction heater according to the present invention. Referring to FIG. 1, the same reference numerals as in FIG. 5 designate the same elements.

Figure 2A:
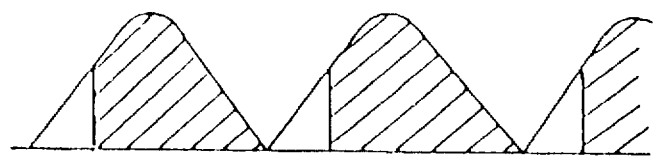
FIG. 2(A) shows a phase-controlling waveform.
Figure 2B:
FIG. 2(B) shows a trigger signal waveform.

In a high-frequency induction heater according to the present invention, a direct current signal of an appointed level or greater as shown in FIG. 2(B) is supplied to a phase-controlling element (a triac 10 in this preferred embodiment) for controlling a high-frequency output. The output is supplied to a high-frequency combustion furnace 1 from a transmission circuit 3, as a trigger signal to stabilize the whole circuit within a low plate electric current range (for example, about 50 mA) of a oscillator tube 4, whereby stably controlling the high-frequency output within not only a high-output range, but also a low-output range. As a result, a high-frequency output, which is not so high as to burn a sample (more preferably, not to decarbonize the sample), is supplied to a high-frequency combustion furnace 1 to heat the sample for an appointed time in an initial heating step, followed by supplying the high-frequency combustion furnace 1 with a high-frequency output capable of burning the sample.

In order to achieve the above-described effect, a power source circuit for the high-frequency induction heater is provided with a transmission circuit 3 that is connected with a work coil 2 of the high-frequency combustion furnace 1 and the phase-controlling element 10 for controlling the high-frequency outputted from the transmission circuit 3 receives a direct current signal of an appointed level as a trigger signal through an isolating circuit 23. As can be seen in FIG. 1, a sample slug is positioned within the working coil or element 2.

Referring to FIG. 1, reference numeral 21 designates a trigger circuit of the triac 10, and reference numeral 22 designates a direct current signal circuit. The trigger circuit 21 is connected with the direct current signal circuit 22 through a photocoupler 23 as the isolating circuit. The trigger circuit 21 comprises two resistances 24, 25 and a light-receiving element 23b of the photocoupler 23 connected in series with the two resistances 24, 25. In addition, the direct current signal circuit 22 comprises a luminous or light-emitting element 23a of the photocoupler 23, a resistance 26, a transistor 27 as a switching element, and a controller 29 for outputting a control signal to the transistor 27 at an appointed time, for example, a DC24V power source 28.

The controller 29 is connected with a microcomputer 30 for controlling the whole high-frequency induction heater and a detected output of a plate ammeter 15 for providing a feedback monitoring of the plate electric current of the oscillator tube 4 so that it is provided to the controller 29.

The transistor 27 is switched on by a control signal from the controller 29 to give a direct current signal of an appointed level or greater, as shown in FIG. 2(B), to the triac 10 as the trigger signal through the photo-coupler 23, whereby striking the triac 10 at an appointed striking angle. A voltage from an alternating current power source 14 is switched on by means of the triac 10 struck at the appointed striking angle, and is supplied to the transmission circuit 3 through a transformer 9 and a rectifier bridge 11, thereby supplying a high-frequency output, which is modulated by a controlled wave in phase to the work coil 2 from the transmission circuit 3, as shown in FIG. 2(B).

With the above-described construction, the plate electric current of the oscillator tube 4 can be continuously changed by continuously charging an on/off timing of the transistor 27 in the direct current signal circuit 22. An optimum burning condition can be achieved by detecting a value of this plate electric current by means of a monitor 15 and feeding back the detected value of a plate electric current to the controller 29.

Figure 3:
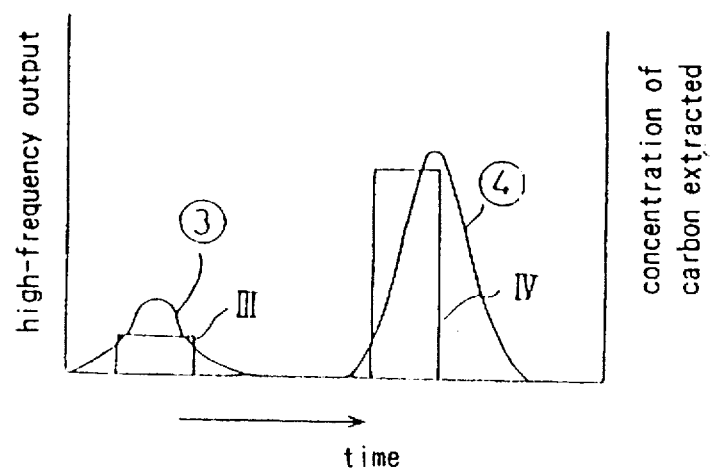
FIG. 3 is a drawing roughly showing a relationship between a high-frequency output and a concentration of carbon extracted in the high-frequency induction heater.
Figure 4B:
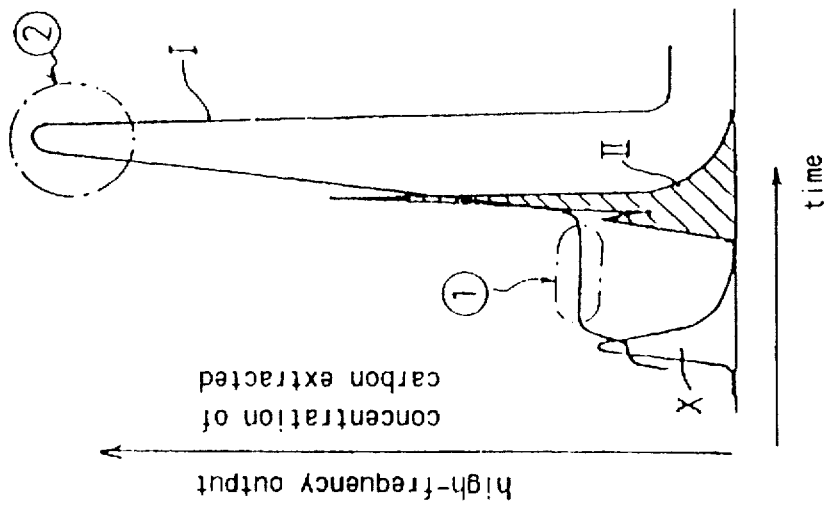
FIG. 4(B) shows a case of a stained sample.
Figure 4A:
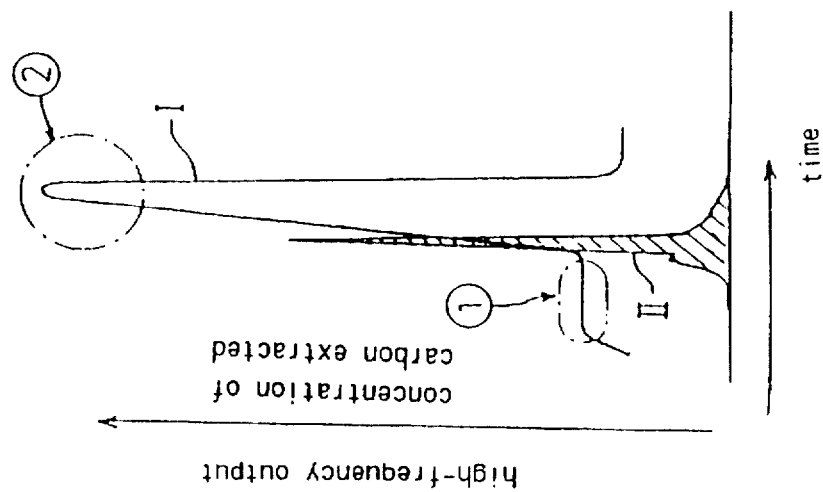
FIG. 4(A) shows a case of a clean sample.

The striking angle of the triac 10 is contracted to supply the high-frequency combustion furnace 1 with the high-frequency output, which is low enough to not burn the sample (shown by a mark III in FIG. 3) in an initial heating step, as shown in FIG. 3. For example, in the case where carbon which is contained in an iron sample is to be analyzed, the sample is not burnt at heating temperatures of 400 to 500° C. Thus, any carbon contained with the iron sample is not decarbonized. The striking angle of the triac 10 is controlled so that the plate electric current of the oscillator tube 4 may be considerably reduced to an extent of 50 mA (this magnitude of electric current is, for example, about one-seventh times the maximum output). Thus, in the case where the sample is heated by such a low output, only stains adhered to a surface of the sample are burnt to generate a carbonic acid gas (shown by a mark ③ in FIG. 3) due to this initial combustion, and an initial measurement is made of merely a concentration of carbon due to the stains.

Subsequently, the striking angle of the triac 10 is adjusted to supply the high-frequency combustion furnace 1 with a high-frequency output (shown by a mark IV in FIG. 3) which is capable of completely burning the sample. Thus, a carbonic acid gas (shown by a mark ④ in FIG. 3) due to any carbon contained within the sample is generated to be able to quantitatively determine the carbon contained within the sample.

In the above-described manner, carbon contained within the sample and carbon adhered to the surface of the sample are extracted with a predetermined time-lag under a condition that they are separated from each other (the marks ③, ④) by their time of combustion. Thus, a concentration of carbon contained in the sample can be accurately analyzed.

In the power source circuit of a high-frequency induction heater having the above-described construction, a signal having a constant voltage of an appointed level or greater is used as a signal for triggering the triac 10. The direct current signal circuit 22 generating this signal is connected with the trigger circuit 21 on the side of the triac 10 through the photocoupler 23 to electrically insulate the trigger circuit 21 from the direct current signal circuit 22. Thus, not only can the triac 10 be stably triggered within a low-output range, but also any instability within the circuit due to noises outputted from the triac 10 itself and a surging electric current can be eliminated. As a result, an electric power can be surely controlled within not only a high-output range, but also a low-output range.

Consequently, for example, in the case where carbon within the sample is analyzed, the sample is heated by the low output, which is so low as not to burn the sample, for an appointed time (this time can be suitably set by the operator in dependence upon a degree of stain of the surface of the sample) to remove the stains from the surface of the sample, followed by raising the output to completely burn the sample, thereby being able to obtain a true analytical value of carbon independent from surface conditions of the sample.

Consequently, it is not required that a separate pretreatment be conducted in the analysis of carbon and the sample does not have to be precisely handled to prevent stains.

In addition, with a high-frequency induction heater according to the present invention, a low-output range can be optionally controlled, so that any pretreatment for removing merely the stains on the surface of the sample can be simply carried out by suitably controlling the heating temperature.

The present invention is not limited by the above-described preferred embodiment. For example, a thyristor may be used as the phase-controlling element 10 in place of the triac, as described in the G.E. SCR Manual, Fourth Edition (1967). In addition, an isolation transformer can be used as the isolating circuit 23 in place of the photocoupler. Furthermore, the present invention can be applied to not only the analysis of carbon, but also to an analysis of sulfur and other elements.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A high-frequency induction heater for a combustion sample furnace, comprising:

a source of power for providing a high-frequency output;

an element for receiving the high-frequency output to apply it to a sample; and circuit means for controlling the application of the high-frequency output to initially limit the output to a value which will be below the combustion level of the sample but will be sufficient to burn any stains on an exterior of the sample, and subsequently increasing the output to a higher level to completely combust the sample, whereby an accurate measurement of the sample can be obtained from combustion gases, including a direct current signal circuit for applying a control trigger signal to provide the high-frequency output.

2. The invention of claim 1 wherein the circuit means includes a transmission circuit connected to the element and a phase controlling device controls the high-frequency output of the transmission circuit in response to the control trigger signal.

3. The invention of claim 2 wherein the phase-controlling device is a triac.

4. The invention of claim 1 wherein the circuit means further includes an isolation circuit which can provide the control trigger signal to the phase controlling device.

5. The invention of claim 4 wherein the isolation circuit includes a light-receiving element and a light-emitting element.

6. The invention of claim 1 wherein the circuit means further includes a microcomputer and a controller for controlling a time period of applying the output.

7. In a high-frequency induction heater having a working coil for providing a high-frequency application of power to a sample, the improvement comprising:

a control circuit for controlling the amount of power to the working coil including a phase control member and means for triggering the phase control element, including a direct current signal circuit for providing a trigger signal to the phase control element to provide at least a first level of power to a sample to heat it below its combustion level for a first predetermined time period, and subsequently a second level of power to a sample to heat it to a combustion point for a second predetermined time period.

8. The invention of claim 7 wherein the phase control element is a triac.

9. The invention of claim 7 wherein the power is supplied to the working coil through a transmission circuit which includes an oscillator and a choke coil connected to the oscillator.

10. The invention of claim 7 wherein the means for triggering includes an isolation circuit with a photocoupler.

11. In a combustion furnace for burning a sample to analyze the resulting combustion gas from the sample having a source of power for providing a high frequency output to the sample and a heating element for receiving the high frequency output to apply it to a sample, the improvement comprising:

a control circuit for providing a first pretreatment application of a first predetermined level of high frequency output to limit the application of the high frequency output to the heating element to below the combustion level of the sample but to a sufficient level to burn any stains on the exterior of the sample, and a second combustion application of the high frequency output at a second predetermined level to the heating element to completely combust the sample, whereby an accurate measurement of the sample can be obtained from the combustion gases, including means for controlling the high frequency output, and a direct current signal circuit for applying a trigger signal to the means for controlling, whereby a first pretreatment trigger signal can be applied and subsequently a second combustion trigger signal can be applied.

12. The invention of claim 11, wherein the means for controlling the high frequency output includes a phase controlling element and further includes an isolation circuit for isolating the phase controlling element from the direct current signal circuit, whereby the direct current signal circuit provides the direct current signal to the phase controlling element through the insulating circuit.

13. The invention of claim 12, wherein the heating element is a coil and an oscillator member is connected to the heating element, and a monitoring circuit is connected to the oscillator member to provide a feedback signal to the control circuit.

14. The invention of claim 13, wherein the phase controlling element is a triac and the isolating circuit includes a light receiving element and a light emitting element.

15. The invention of claim 14, wherein the first predetermined level of high-frequency output provides a temperature of approximately 400° C. to 500° C.

16. The invention of claim 15, wherein the source of power is an alternating current source of 200 volts at 50 to 60 Hz.

17. The invention of claim 13, wherein the control circuit includes a CPU.

* * * * *